United States Patent [19]

Zyburt et al.

[11] Patent Number: 5,906,647

[45] Date of Patent: May 25, 1999

[54] VEHICLE MOUNTED GUIDANCE ANTENNA FOR AUTOMATED DURABILITY ROAD (ADR) FACILITY

[75] Inventors: Jeffrey P. Zyburt, Chelsea; Allan L. Cowan, Stockbridge; Donald W. Grimaudo, Riverview; Frederick J. Shaffer, Brooklyn, all of Mich.

[73] Assignee: Chrysler Corporation, Auburn Hills, Mich.

[21] Appl. No.: 08/708,243

[22] Filed: Sep. 3, 1996

[51] Int. Cl.$^6$ .................................................. G06F 165/00
[52] U.S. Cl. .................................. 701/24; 701/2; 318/587
[58] Field of Search ................................ 701/2, 23, 24, 701/41; 340/938, 939, 941, 992, 993; 180/168, 169, 167; 318/587; 455/99, 54.1

[56] References Cited

U.S. PATENT DOCUMENTS

| H1469 | 8/1995 | Simonoff | 341/176 |
|---|---|---|---|
| 1,722,069 | 7/1929 | Widney . | |
| 1,950,640 | 3/1934 | Twyman | 254/93 |
| 2,716,561 | 8/1955 | Beran | 280/150 |
| 3,001,394 | 9/1961 | Nelson | 73/71.7 |
| 3,330,477 | 7/1967 | Stephens | 235/61 |
| 3,465,577 | 9/1969 | Donovan | 73/116 |
| 3,520,180 | 7/1970 | Polhemus et al. | 73/71.7 |
| 3,556,244 | 1/1971 | Gray | 180/98 |
| 3,662,593 | 5/1972 | Pirrello et al. | 73/132 |
| 3,696,882 | 10/1972 | Martin | 180/98 |
| 3,713,332 | 1/1973 | Herrbrich | 73/117 |
| 3,877,299 | 4/1975 | Clayton, Sr. et al. | 73/132 |

(List continued on next page.)

FOREIGN PATENT DOCUMENTS

| 0236518 | 9/1987 | European Pat. Off. . |
|---|---|---|
| 0235333 | 5/1989 | European Pat. Off. . |
| 1376438 | 12/1964 | France . |
| 2004979 | 8/1971 | Germany . |
| 3744-631 | 7/1989 | Germany . |
| 3940588 A1 | 6/1991 | Germany . |
| 62-67423 | 3/1987 | Japan . |
| 2236366 | 9/1989 | United Kingdom . |

OTHER PUBLICATIONS

Jurgen Raschke and Bodo Titze "Automatic Driver for Exhaust Emission and Consumption Measurements," Automobiltechnische Zeitschrift 88 (1986) 7/8.

Joe Quinlan "The Great AGVS Race," Material Handling Engineering, vol. 35, Mo. 6, pp. 56–64 (Jun. 1980).

Juerg Sommer "Digitron's Automated Guided Vehicle Systems are Controlled by Standard Software: A Field–Proven Approach," MFS (Conferences) Ltd. 1st International Conference on Automated Guided Vehicle Systems, Jun. 2–4, 1981, pp. 95–101.

E. W. Morris "Developments in Guided Vehicle Systems—Possibilities and Limitations and the Economics of their Operation," MFS (Conferences) Ltd. 1st International Conference on Automated Guided Vehicle Systems, Jun. 2–4, 1981, pp. 67–76.

F. Gentil and G. Prodo "Guided Vehicle Systems at Renault," MFS (Conferences) Ltd. 1st International Conference on Automated Guided Vehicle Systems, Jun. 2–4, 1981, pp. 59–65.

L. Marce, M. Julliere and H. Place "An Autonomous Computer–Controlled Vehicle," MFS (Conferences) Ltd. 1st International Conference on Automated Guided Vehicle Systems, Jun. 2–4, 1981, pp. 113–122.

Primary Examiner—Tan Q. Nguyen

[57] ABSTRACT

A right inductive coil is coupled to a vehicle at a first location offset from the vehicle's centerline for generating a first signal in response to an electromagnetic signal in a guide wire beneath the vehicle. Similarly, a left inductive coil coupled to the vehicle opposite the right coil relative to the centerline for generating a second signal in response to an electromagnetic signal in the guide wire. A signal comparator receives the signals and generates a guidance signal representative of the combination of the signals. Also, a position antenna is movably mounted in the vertical dimension on the vehicle for generating query pulses and detecting echo pulses from transponders embedded in a test track.

5 Claims, 9 Drawing Sheets

U.S. PATENT DOCUMENTS

| | | | |
|---|---|---|---|
| 3,993,156 | 11/1976 | Rubel | 180/168 |
| 4,215,759 | 8/1980 | Diaz | 180/168 |
| 4,334,221 | 6/1982 | Rosenhagen et al. | 340/825.72 |
| 4,361,202 | 11/1982 | Minovitch | 180/168 |
| 4,379,497 | 4/1983 | Hainsworth et al. | 180/168 |
| 4,442,708 | 4/1984 | Gable et al. | 73/117 |
| 4,466,279 | 8/1984 | Gable et al. | 73/117 |
| 4,495,801 | 1/1985 | Sugimoto | 73/117 |
| 4,499,784 | 2/1985 | Shum | 74/479 |
| 4,530,056 | 7/1985 | MacKinno et al. | 364/424 |
| 4,554,824 | 11/1985 | King et al. | 73/117 |
| 4,556,940 | 12/1985 | Katoo et al. | 364/424 |
| 4,585,273 | 4/1986 | Higgs et al. | 297/452 |
| 4,602,334 | 7/1986 | Salesky | 364/424 |
| 4,616,326 | 10/1986 | Meier et al. | 364/513 |
| 4,621,525 | 11/1986 | King et al. | 73/117 |
| 4,647,784 | 3/1987 | Stephens | 250/561 |
| 4,649,742 | 3/1987 | Klausnitzer et al. | 73/117 |
| 4,656,406 | 4/1987 | Houskamp | 318/587 |
| 4,700,301 | 10/1987 | Dyke | 364/424 |
| 4,742,283 | 5/1988 | Bolger et al. | 318/587 |
| 4,742,720 | 5/1988 | Storck | 73/865.9 |
| 4,777,601 | 10/1988 | Boegli | 364/424.02 |
| 4,780,817 | 10/1988 | Lofgren | 364/424.01 |
| 4,790,177 | 12/1988 | King et al. | 73/117 |
| 4,791,570 | 12/1988 | Sherman et al. | 364/436 |
| 4,799,915 | 1/1989 | Lehmann et al. | 446/279 |
| 4,804,937 | 2/1989 | Barbiaux et al. | 340/52 F |
| 4,813,751 | 3/1989 | Fenn | 312/235 A |
| 4,817,040 | 3/1989 | Bodley-Scott | 364/424.04 |
| 4,822,104 | 4/1989 | Plesniarski | 297/468 |
| 4,855,656 | 8/1989 | Saitoh et al. | 318/587 |
| 4,855,822 | 8/1989 | Narendra et al. | 358/103 |
| 4,860,209 | 8/1989 | Sugimoto et al. | 364/424.02 |
| 4,913,490 | 4/1990 | Takahashi et al. | 297/250 |
| 4,939,651 | 7/1990 | Onishi | 364/424.02 |
| 4,946,120 | 8/1990 | Hatcher | 248/183 |
| 4,954,761 | 9/1990 | Kimura et al. | 318/568.1 |
| 4,973,083 | 11/1990 | Richards et al. | 280/801 |
| 5,012,689 | 5/1991 | Smith | 74/89.17 |
| 5,032,994 | 7/1991 | Wellman | 364/424.02 |
| 5,036,935 | 8/1991 | Kohara | 180/168 |
| 5,068,790 | 11/1991 | Wellman | 364/424.02 |
| 5,068,791 | 11/1991 | Klopfleisch et al. | 364/424.02 |
| 5,075,853 | 12/1991 | Luke, Jr. | 364/424.02 |
| 5,111,401 | 5/1992 | Everett, Jr. et al. | 364/424.02 |
| 5,126,941 | 6/1992 | Gurmu et al. | 364/424.02 |
| 5,128,599 | 7/1992 | Nikolaus et al. | 318/685 |
| 5,131,682 | 7/1992 | Reed | 280/801 |
| 5,163,001 | 11/1992 | Luke, Jr. | 364/424.02 |
| 5,172,589 | 12/1992 | Witt | 73/132 |
| 5,175,480 | 12/1992 | McKeefery et al. | 318/587 |
| 5,179,329 | 1/1993 | Nishikawa et al. | 318/587 |
| 5,184,694 | 2/1993 | McGrath, Jr. et al. | 180/167 |
| 5,189,612 | 2/1993 | Lemercier et al. | 364/424.02 |
| 5,193,062 | 3/1993 | Murase et al. | 364/426.04 |
| 5,197,346 | 3/1993 | Zona et al. | 74/479 |
| 5,220,497 | 6/1993 | Trovato et al. | 364/167.01 |
| 5,248,187 | 9/1993 | Harrison | 297/482 |
| 5,270,628 | 12/1993 | Noguchi et al. | 318/587 |
| 5,271,092 | 12/1993 | Kreuzer | 395/90 |
| 5,283,739 | 2/1994 | Summerville et al. | 364/424.02 |
| 5,289,183 | 2/1994 | Hassett et al. | 340/905 |
| 5,295,551 | 3/1994 | Sukonick | 180/167 |
| 5,299,130 | 3/1994 | Ono | 364/424.02 |
| 5,303,154 | 4/1994 | Luke, Jr. | 364/424.02 |
| 5,303,163 | 4/1994 | Ebaugh et al. | 364/550 |
| 5,318,143 | 6/1994 | Parker et al. | 180/168 |
| 5,341,130 | 8/1994 | Yardley et al. | 340/825.06 |
| 5,357,824 | 10/1994 | Hashimoto | 74/479 BP |
| 5,363,027 | 11/1994 | Noguchi | 318/573 |
| 5,369,581 | 11/1994 | Ohsuga et al. | 364/424.01 |
| 5,369,591 | 11/1994 | Broxmeyer | 364/461 |
| 5,372,035 | 12/1994 | Ogawa et al. | 73/117 |
| 5,379,469 | 1/1995 | Millis et al. | 5/95 |
| 5,379,664 | 1/1995 | Kershaw et al. | 74/490.05 |
| 5,394,743 | 3/1995 | Noguchi et al. | 73/117 |
| 5,396,792 | 3/1995 | Kohsaka et al. | 73/117 |
| 5,402,051 | 3/1995 | Fujiwara et al. | 318/587 |
| 5,415,034 | 5/1995 | Nishikawa et al. | 73/117 |
| 5,416,394 | 5/1995 | Lee | 318/569 |
| 5,420,794 | 5/1995 | James | 364/436 |
| 5,430,645 | 7/1995 | Keller | 364/424.01 |
| 5,434,781 | 7/1995 | Alofs et al. | 364/424.02 |
| 5,442,553 | 8/1995 | Parrillo | 364/424.04 |
| 5,446,356 | 8/1995 | Kim | 318/587 |
| 5,448,479 | 9/1995 | Kemner et al. | 364/424.02 |
| 5,450,321 | 9/1995 | Crane | 364/424.04 |
| 5,467,084 | 11/1995 | Alofs et al. | 340/933 |
| 5,468,046 | 11/1995 | Weber et al. | 297/238 |
| 5,469,356 | 11/1995 | Hawkins et al. | 364/424.02 |
| 5,485,892 | 1/1996 | Fujita | 180/167 |
| 5,666,101 | 9/1997 | Cazzani et al. | 340/323 R |
| 5,708,427 | 1/1998 | Bush | 340/941 |
| 5,778,327 | 7/1998 | Simmons et al. | 701/23 |

VEHICLE MOUNTED GUIDANCE ANTENNA FOR AUTOMATED DURABILITY ROAD (ADR) FACILITY

FIELD OF INVENTION

The present invention relates generally to automobile testing, and more particularly to computer-controlled testing at automobile proving grounds.

BACKGROUND OF THE INVENTION

New models of vehicles are thoroughly tested by manufacturers at proving grounds prior to marketing the vehicles. Indeed, vehicle models that have been marketed for some time often undergo continued testing. Such testing includes prolonged operation of test vehicles around a test track, to determine the vehicles' operational fitness. The advantages of vehicle testing in ensuring safe, satisfactory vehicles having long been recognized, vehicle testing has become a necessary and ubiquitous part of vehicle development. It can be readily appreciated, however, that using human drivers to test drive vehicles hundreds of thousands of miles is economically costly for manufacturers to use human drivers, and physically demanding on the drivers.

It happens that test time and mileage can be reduced, and test effectiveness enhanced, by driving test vehicles over rough test tracks, in addition to driving test vehicles over smoothly paved tracks. In other words, time can be saved, testing costs can be reduced, and test effectiveness can be improved by using rough tracks. Unfortunately, prolonged driving over rough tracks is extremely physically demanding on human test drivers. Indeed, a human driver's operating time over such tracks must be severely limited for the driver's protection.

As advantageously recognized by the present invention, the above-stated advantages of using vehicle testing can be realized without requiring human test drivers by providing a computer-controlled facility for testing vehicles. Thereby, test costs are significantly reduced and test driver fatigue and discomfort are eliminated.

Of importance to the present invention is the computer control system of the test facility. As recognized herein, to provide for completely automated test driving and safety, the computer control system must perform a plethora of tasks. These tasks include providing for the interactive definition of vehicle test profiles (referred to herein as "missions"), and the avoidance of mutual interference ("MI") between vehicles. Also, vehicle operation must be monitored and displayed for facility operators. The present invention both advantageously recognizes the above-noted problems, and addresses them using the novel inventive principles discussed below.

Accordingly, it is an object of the present invention to provide, in an automated durability road facility, a computer control system for automatically controlling the operation of the vehicles to be tested. Another object of the present invention is to provide a computer control system for an automated test facility that avoids mutual interference between vehicles during testing. Yet another object of the present invention is to provide a computer control system for an automated test facility that provides for displaying and updating vehicle status. Still another object of the present invention is to provide an automated durability road facility that is easy to use and cost-effective.

SUMMARY OF THE INVENTION

A guidance signal sensing system is disclosed for generating a guidance signal that is usable by a computer. A vehicle defines a longitudinal centerline, and the computer guide the vehicle along a test track having a guide wire embedded in the track. Per the present invention, the system includes a right inductive coil that is mountable on the vehicle at a first location. This first location is offset from the longitudinal centerline for generating a first signal in response to an electromagnetic signal in the guide wire. A left inductive coil is mountable on the vehicle at a location opposed to the right inductive coil relative to the longitudinal centerline. Like the right coil, the left coil generates a signal in response to an electromagnetic signal in the guide wire. A signal comparator is in signal communication with the coils for receiving the signals and generating a guidance signal representative of the combination of the signals.

Preferably, a computer is electrically connected to the signal comparator for receiving the guidance signal. The computer generates a control signal in response thereto. Advantageously, right and left mounts respectively hold the right and left coils onto a vehicle.

In one presently preferred embodiment, the guidance signal is a balanced signal when the lateral distance between the guide wire at a location opposed to the right inductive coil relative to the longitudinal centerline and the right coil equals the lateral distance between the guide wire and the left coil. In other words, when the vehicle is longitudinally centered over the guide wire, the guidance signal is balanced. Otherwise, the guidance signal is an unbalanced signal.

In another aspect of the present invention, a vehicle is movable along a test track having a guide wire. In accordance with the present invention, the vehicle includes a chassis defining a longitudinal centerline and right and left inductive coils coupled to the chassis. As intended by the present invention, the right coil is positioned at a first location offset from the longitudinal centerline for generating a first signal in response to an electromagnetic signal in the guide wire. On the other hand, the left coil is positioned opposite the right coil relative to the longitudinal centerline for generating a second signal in response to an electromagnetic signal in the guide wire. A signal comparator receives the first and second signals and generating a guidance signal representative of the combination of the first and second signals.

In still another aspect, a method is disclosed for generating a signal representative of the position of a vehicle relative to a guide wire. The vehicle defines a longitudinal centerline, and the method steps include sensing the guide wire from a first location on the vehicle offset from the longitudinal centerline and generating a first signal in response. Also, the method includes sensing the guide wire from a second location on the vehicle opposed to the first location relative to the centerline the vehicle and generating a second signal in response. Then, a guidance signal is generated that is representative of the combination of the first and second signals.

In yet another aspect, a position system is disclosed for a remotely controlled vehicle disposed on a track having position transponders embedded therein. The position system includes a vehicle controller (VCON) that is mounted in the vehicle. A position antenna is movably mounted on the vehicle between a first position and a second position higher than the first. In accordance with the present invention, the position antenna is electrically connected to the VCON for transmitting a query pulse and detecting an echo pulse from one of the transponders.

Preferably, an antenna mount has a stationary frame member that is connectable to rear license plate fastener receptacles of the vehicle. The mount also has a sliding frame member which is slidably engaged with the stationary frame member, and the antenna is held by the sliding frame member. Advantageously, the antenna is a generally rectangular loop antenna, and the sliding frame member includes a transversely-oriented lower support block formed with side channels for respectively supporting side segments of the position antenna. Additionally, the sliding frame member includes left and right plastic connecting plates fastened to the lower support block for maintaining the shape of the position antenna.

Moreover, the sliding frame member includes left and right vertically-oriented slide bars attached to the connecting plates. Furthermore, left and right bar bearings are formed on the stationary frame member, and each bar bearing is formed with a channel for closely supporting one of the slide bars. Consequently, the slide bars are slidably engaged with the respective channels. Respective set screws are manipulable for abutting respective slide bars to establish a height of the position antenna as appropriate for proper reception of echo signals from the transponders.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
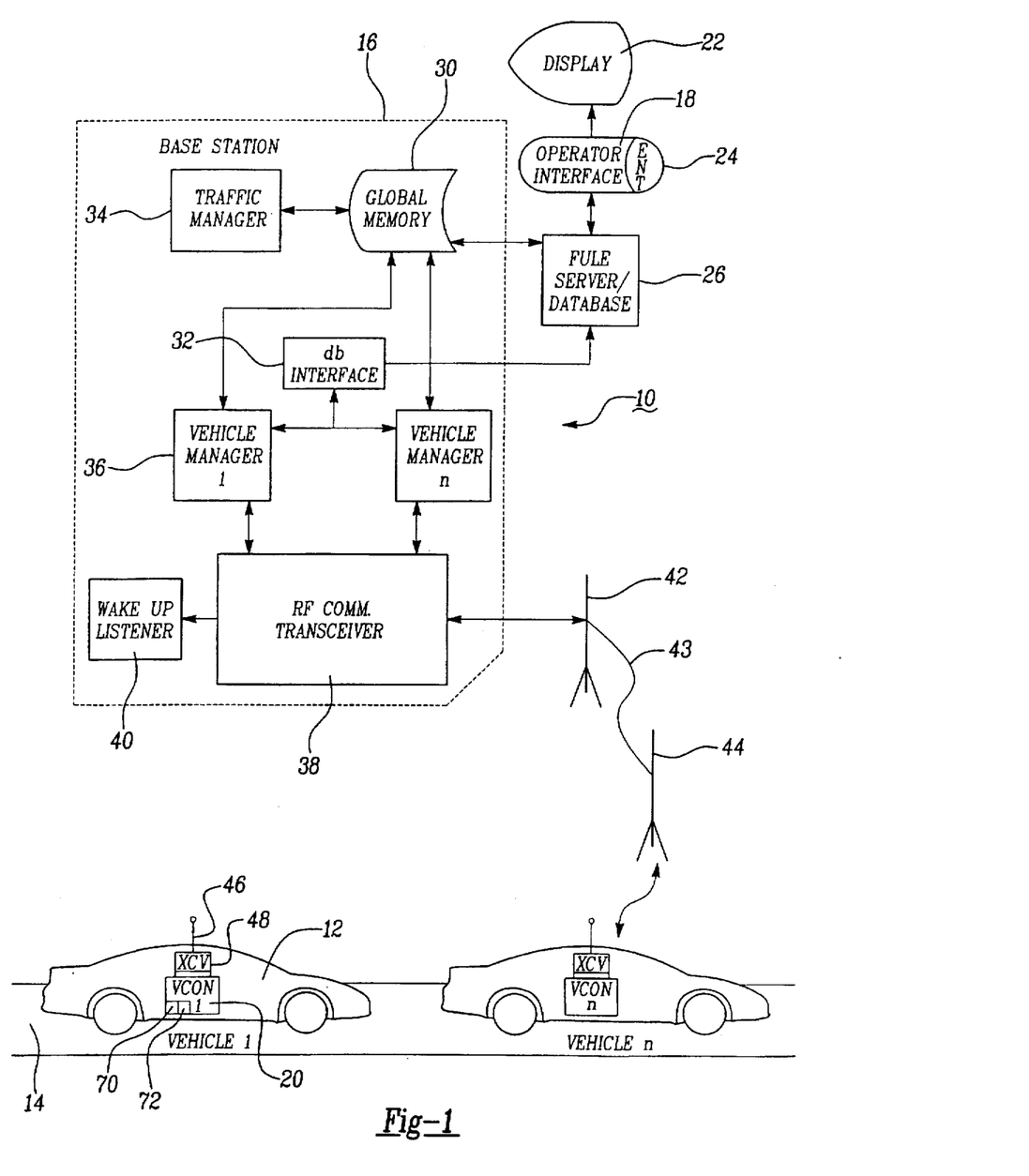
FIG. 1 is a schematic diagram of the control system for automated test facility of the present invention.

Referring initially to FIG. 1, a control system is shown, generally designated 10, for automatically guiding a plurality of vehicles 12 around a test track 14. The system 10 shown in FIG. 1 includes a base station 16 and an operator interface 18. As discussed more fully below, an operator can, via the operator interface 18, input data to the base station 16 that is representative of a desired movement or series of movements of each vehicle 12 around the test track 14. In accordance with the present invention, the base station 16 communicates with vehicle controllers (VCON) 20 that are positioned in the passenger compartments of respective vehicles 12, and the VCON 20 are operably associated with various control apparatus to operate the controls of the associated vehicle 12 to cause the vehicle 12 to move. Details of the mechanical components of the control apparatus within each vehicle 12 can be found in the above-referenced patent applications, the disclosures of which are incorporated herein by reference.

Figure 1A:
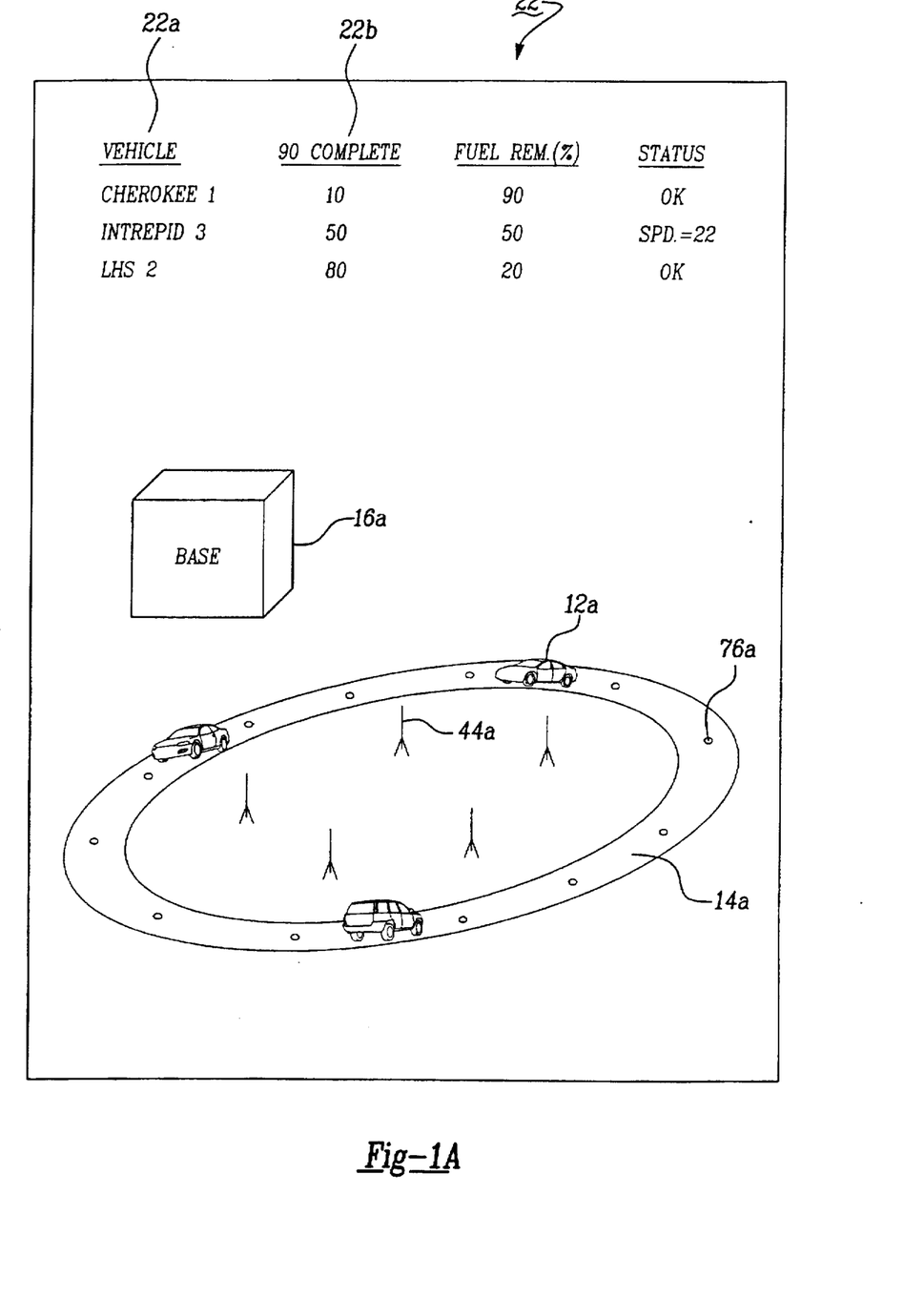
FIG. 1A is a schematic representation of a graphic display of the operator interface.

FIG. 1 shows that the operator interface 18 is electrically connected to a data display device 22, e.g., a video monitor. Referring briefly to FIG. 1A, the data display device 22 can include both alpha-numeric and graphical data presentations. For example, the display device 22 can display a column 22a of alpha-numeric characters representative of the model and test number of each vehicle 12, followed by a column 22b of alpha-numeric characters representative of the percentage completion of the desired test for the vehicle listed in the same row. Also, the display device 22 can display a column 22c of alpha-numeric characters showing the quantity of fuel remaining, in percent, for each vehicle, followed by a column 22d of alpha-numeric characters showing the status of the associated vehicle 12, e.g., "OK".

Additionally, the display device 22 can present two-dimensional or three-dimensional images 12a of the vehicles 12, as well as an image 14a of the track 14. Also, the display device 22 can present an image 44a of relay antennas discussed below. Further, the display device 22 can present an image 16a of the base station 16, and images 76a of position transponders discussed further below.

Referring back to FIG. 1, the operator interface 18 is electrically connected to an input device 24, e.g., a keyboard, mouse, touch screen, pen, or voice recognition device. In the presently preferred embodiment, the operator interface 18 is a personal computer or laptop computer which recognizes machine readable computer code to execute desired input commands, store and transfer data, etc. in accordance with principles well-known in the art.

It is to be understood that the operations of the operator interface 18, as well as the operations of the base station 16 described below, could be embodied in machine-readable form and stored on a computer program storage device having a data storage medium, such as a computer floppy diskette. Alternatively, such media can also be found in semiconductor devices, on magnetic tape, on optical disks, on a DASD array, on magnetic tape, on a conventional hard disk drive, on electronic read-only memory or on electronic random access memory, or other appropriate data storage device. In an illustrative embodiment of the invention, the computer-executable instructions may be lines of compiled C or C++ language code.

Those skilled in the art will appreciate that the flow charts described below illustrate the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the Figures.

As shown in FIG. 1, the operator interface 18 is electrically connected to a file server/database 26. In the presently preferred embodiment, the file server/database 26 includes a Cybase database on a Novell server, running on a model 486 computer made by Intel.

The base station 16 includes a global memory 28 for electronically storing data pertaining to the operation of the system 10. As shown, the global memory 28 is electrically connected to the file server/database 26. Also, the base station 16 includes a database interface (db interface) 32 which functions as an interface between the file server/database 26 and base station 16 in accordance with principles discussed below.

A traffic manager 34 of the base station 16 is in communication with the global memory 30 for purposes to be shortly disclosed. Likewise, a plurality of vehicle managers 36 are in communication with the global memory 30. It is to be understood that a respective vehicle manager 36 is associated with each vehicle 12 on the track 14. As also shown, the vehicle managers 36 are also in communication with the db interface 32 for receiving and sending information to and from the file server/database 26.

In addition, each vehicle manager 36 is electrically connected to a radiofrequency (rf) communications base transceiver 38. As intended by the present invention, the transceiver 38 is a spread spectrum transceiver. As recognized by the present invention, such a transceiver provides high data bandwidth and relative immunity from multi-path effects. Preferably, the base transceiver 38 is an ARLAN transceiver made by Aironet of Canada operating at a frequency in the range of between about eight hundred megaHertz and five gigaHertz (800 mHz–5 gHz) and preferably at a frequency of 2.46 gHz.

As shown in FIG. 1, the base transceiver 38 is in communication with a wake-up listener module 40 of the base station 16. In accordance with the presently preferred embodiment, the database interface 32, traffic manager 34, vehicle managers 36, and wake-up listener 40 are realized in software, and that the base station 16 accordingly is a computer. Preferably, the base station 16 is a type Alpha computer made by Digital Electronics Corp. (DEC).

The base transceiver 38 is electrically connected to a base antenna 42, and as can be appreciated in reference to FIG. 1, the base antenna 42 is in communications with one or more other components of the system 10. Specifically, the transceiver 38 via the base antenna 42 communicates, preferably via dual point fiber optic pairs 43, with one or more (preferably five) relay stations 44 that are positioned in sequence around the track 14. Also, the relay stations 44 are in rf communication with the vehicles 12 via respective vehicle antennae 46 that are mounted on the roofs of their respective vehicles 12. In turn, each vehicle antenna 46 is electrically connected to a respective vehicle transceiver 48 within the associated vehicle 12. Like the base transceiver 38, the vehicle transceivers 48 are preferably ARLAN transceivers, with the outputs of each vehicle transceiver 48 being sent to a respective VCON 20.

Figure 2:
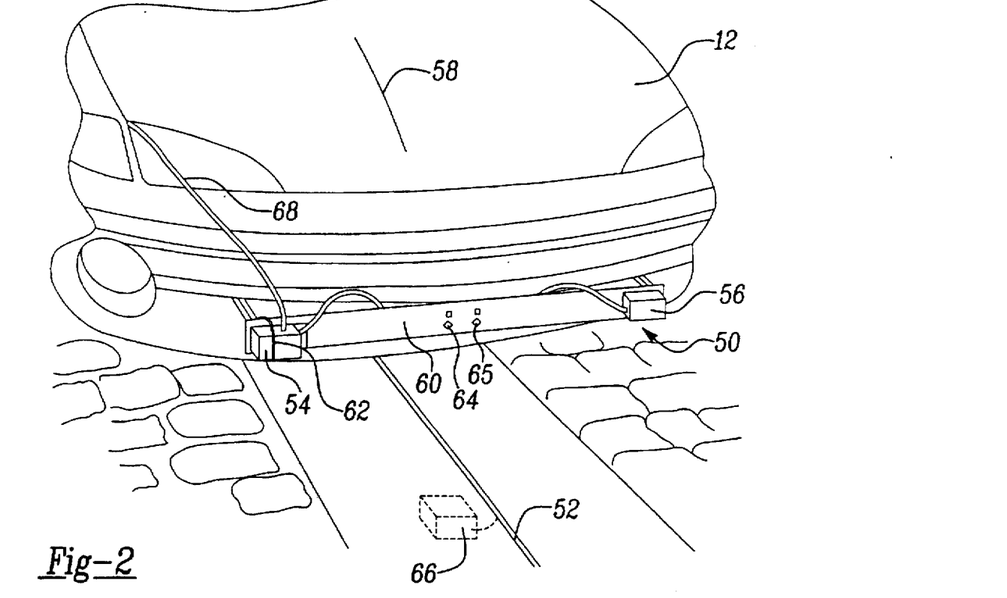
FIG. 2 is a perspective view of a test vehicle showing the guidance antennas and guide wire, with portions of the vehicle broken away.

Now referring to FIG. 2, each vehicle 12 includes a respective guidance antenna, generally designated 50, for sensing one of a plurality of guide wires 52 (only one guide wire 52 shown) that are embedded in the track 14, generally parallel to and spaced from each other. Occasionally, however, the wires intersect for lane change purposes. It is to be understood that in the preferred embodiment, the guidance antenna 50 is a dual-coil antenna that generates a guidance signal which is usable by the associated VCON 20 to guide the vehicle 12.

In the preferred embodiment shown, the guidance antenna 50 includes a right inductive coil 54 and a left inductive coil 56. As shown, the vehicle 12 defines a longitudinal centerline 58, and the coils 54, 56 are mounted on the vehicle 12 and are spaced from the centerline 58 of the vehicle 12 equally and oppositely from each other. In the preferred embodiment, the coils 54, 56 are spaced eighteen inches (18") to the right and left, respectively, of the centerline 58 of the vehicle 12. Also, the coils 54, 56 are positioned roughly twelve inches (12") above the ground.

As shown, each coil 54, 56 is affixed to an elongated rigid support brace 60 by respective left and right mounts, e.g., by means of respective ties 62 or bolts (not shown). In turn, the support brace 60 is advantageously mounted on the front of the vehicle 12 as shown, preferably by engaging four bolts 64 with four respective holes 65 that are formed in the brace 60. The bolts 64 are in turn threadably engaged with the standard four front license plate attaching nuts of the vehicle 12. Thereby, easy mounting of the guidance antenna 50 is facilitated on a wide variety of vehicles 12.

According to the present invention, each guide wire 52 is electrically connected to a frequency generator 66 for generating a signal that is characterized by a frequency in the associated guide wire 52. The frequency in each guide wire 52 is different from the frequencies in the other guide wires. Consequently, the VCON 20 of a vehicle 12 is instructed to follow a predetermined frequency and, hence, to cause the associated vehicle 12 to follow a predetermined course around the test track 14. It is to be understood that with the above-disclosed novel arrangement, the VCON 20 can be programmed to follow a first frequency around a predetermined part of the track 14, and then switch to and follow a second frequency, thereby changing its course to another guide wire 52.

As intended by the present invention, the frequency generator 66 includes a controllable current amplifier characterized by low distortion and low noise, thereby facilitating the establishment of a constant field strength in the guide wire 52 independent of the particular frequency selected. Preferably, the frequency generator 66 is a crystal controlled oscillator.

Accordingly, the electromagnetic field generated by the wire 52 when it is energized induces the coils 54, 56 to generate respective guidance error signals. In turn, the signals from the coils 54, 56 are conducted to the associated VCON 20 via electrical leads 66. When the coils 54, 56 are spaced laterally equidistantly from the guide wire 52 (and, hence, when the vehicle 12 is centered over the wire 52), the guidance error signals are equal and when combined together they establish a balanced signal. On the other hand, when the coils 54, 56 are not spaced equidistantly from the guide wire 52, when the guidance error signals are combined together they produce an unbalanced signal with a polarity consistent with the lateral error from center.

Referring briefly back to FIG. 1, as more fully disclosed below the VCON 20 includes one or more servo controllers 70. The servo controller 70 generates a position signal representative of the combination of the guidance error signals and sends it to a computer 72. The servo controller 70 controls the steering wheel of the vehicle 12.

Figure 3:
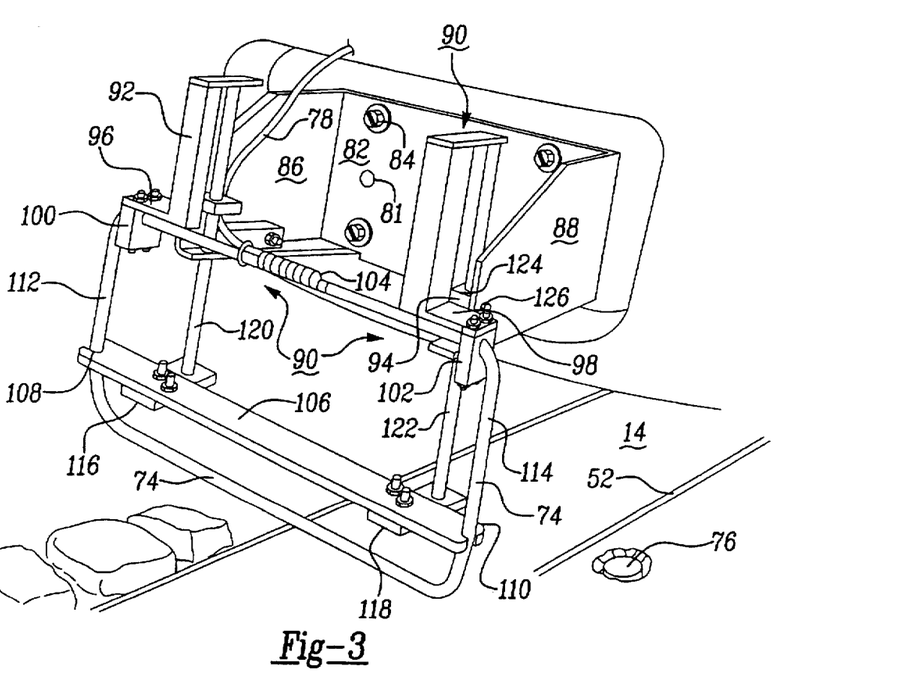
FIG. 3 is a perspective view of a test vehicle showing the position antenna juxtaposed with a position transponder, with portions of the vehicle broken away.

Referring now to FIG. 3, a position loop antenna 74 having five turns of wire is movably mounted to the vehicle 12 and is configured generally as a rectangle. As discussed further below, the track location antenna 74 senses position identification signals from rf position transponders 76 that are embedded in the track 14 adjacent the guide wire 52 at known fixed locations. Indeed, the system 10 contains a map of the entire track 14 with transponders 76.

In the presently preferred embodiment, the transponders 76 are TIRIS transponders made by Texas Instruments. Per the present invention, several query pulses per second are generated by the VCON 20 and are transmitted from the track location antenna 74. When the track location antenna 74 is adjacent one of the transponders 76 and the track location antenna 74 emits a query pulse, the transponder 76 is energized by the query pulse to emit a position identification signal pulse in response back to the track location antenna 74. The position identification signal pulse contains information that represents the identity of the particular transponder 76 (and, hence, the position of the vehicle 12 on the track 14).

In turn, the position identification signal pulses are sent via an electrical lead 78 (FIG. 3) to the VCON 20 (FIG. 1) of the vehicle 12. The VCON 20 determines its position on the track 14 based on the position identification signal pulse, and then transmits a position signal, via the communication system discussed above, to the base station 16 (FIG. 1).

As recognized by the present invention, components of the vehicle 12 can interfere with proper reception of position identification signal pulses by the track location antenna 74. As further recognized herein, variations in vehicle fuel tank location, exhaust pipes, etc. exist between the various vehicle models it is desired to test. Consequently, the present invention recognizes that it would be advantageous to provide for easily mounting the track location antenna 74 on the vehicle 12, and for adjusting the height of the antenna 74 as appropriate to ensure satisfactory reception of the position identification signal pulses from the transponders 76.

Accordingly, FIG. 3 shows that the track location antenna 74 is movably mounted on the rear of the vehicle 12 for movement of the antenna 74 in the vertical dimension as appropriate to ensure adequate reception of the position identification signal pulses. In the particularly preferred embodiment shown, a stationary frame member 80 includes a flat plate 82 that is formed with a plurality of holes 81. The holes 81 are spaced apart so that four respective bolts 84 can be advanced through the holes and into threadable engagement with the four rear license plate frame receptacles of the vehicle 12. Additionally, the stationary frame member 80 includes left and right flanges 86, 88 that are formed integrally with or attached to the plate 82 and extend longitudinally rearwardly therefrom.

A sliding frame member, generally designated 90, is slidably engaged with the stationary frame member 80 for vertical motion of the sliding frame member 90 relative to the vehicle 12. As shown in FIG. 3, the sliding frame member 90 includes left and right upper L-beams 92, 94. Respective upper support flanges 96, 98 extend laterally outwardly from the L-beams 92, 94, and respective plastic support blocks 100, 102 depend downwardly from and are bolted to the upper support flanges 96, 98. A top segment 104 of the track location antenna 74 is snugly sandwiched between the plastic support blocks 100, 102 and the upper support flanges 96, 98 as shown.

Further, the sliding member 90 includes an elongated, transversely-oriented plastic lower support block 106 that is formed with side channels 108, 110 for respectively supporting side segments 112, 114 of the track location antenna 74. Left and right plastic connecting plates 116, 118 are bolted to the lower support block 106 as shown. With the above-disclosed support structure, the shape of the track location antenna 74 is advantageously maintained by electrically insulative components.

Additionally, left and right elongated, vertically-oriented cylindrical slide bars 120, 122 are attached to the connecting plates 116, 118. As shown in FIG. 3, the slide bars 120, 122 are slidably engaged with complementarily-shaped channels in respective bar bearings 124 (only one bearing 124 shown) that are formed integrally with or affixed to the flanges 86, 88 of the stationary frame member 80.

Respective set screws 126 (only a single set screw shown) are threadably engaged with the flanges 86, 88, and the set screws 126 can be manipulated to abut the respective slide bars 120, 122. It can now be appreciated that the set screws 126 can be loosened to release the slide bars 120, 122 and permit moving the sliding frame member 90 with track location antenna 74 up and down as appropriate to establish a height of the antenna 74 as appropriate for proper reception of position identification signal pulses from the transponders 76. Then, the set screws 126 can be tightened against the slide bars 120, 122 to stationarily hold the sliding frame member 90 against the stationary frame member 80 and thereby maintain the established height of the track location antenna 74.

Figures 4, 5:
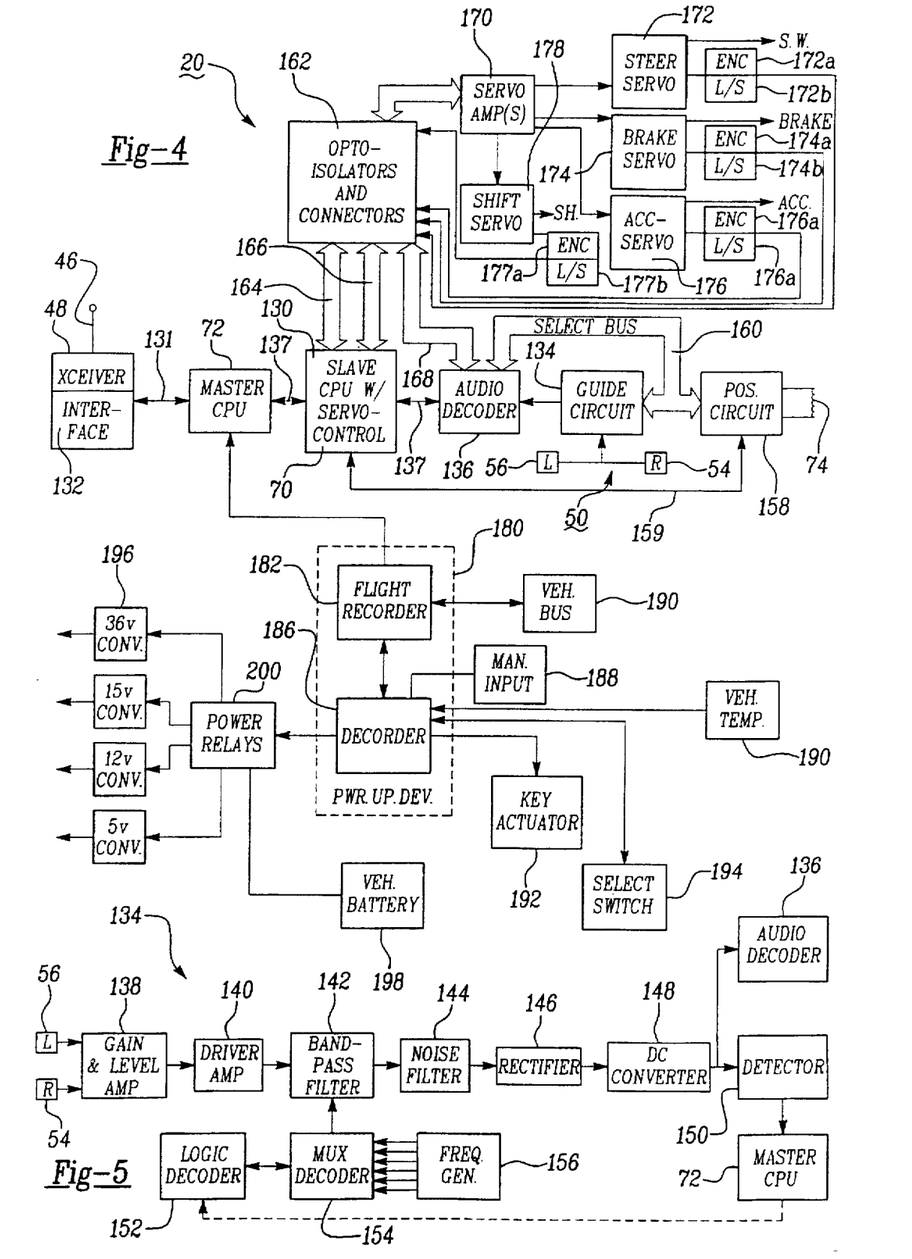
FIG. 4 is a schematic diagram of the vehicle controller (VCON) of the present invention.
FIG. 5 is a schematic diagram of the guide board of the present invention.

Referring now to FIG. 4, the details of the VCON 20 of the present invention can be seen. As shown, the VCON 20 includes a computer or master central processing unit (CPU) 72, preferably a type MVME 162/22 CPU made by Motorola. As shown, the master CPU 72 is electrically connected to a slave CPU 130, and the slave CPU 130 includes the servo controller 70. In the preferred embodiment, the servo controller 70 is a servo controller made by Technology 80.

Additionally, the master CPU 72 is also connected via a coaxial cable 131 to the vehicle transceiver 48 via a transceiver interface 132. In accordance with principles well-known in the data communications art, the transceiver interface 132 translates data from the transceiver 48 into binary code that is recognizable by the master CPU 72. Also, the transceiver interface 132 translates binary code from the master CPU 72 into data that is intelligible to the transceiver 48. In the preferred embodiment, the transceiver interface 132 translates binary code from the master CPU 72 into a ten base two format for transmission of the data by the vehicle transceiver 48 to the base station 16.

FIG. 4 shows that the slave CPU 130 with servo controller 70 is operationally connected to both the track location antenna 74 and the coils 54, 56 of the guidance antenna 50. With particular regard to the coils 54, 56, the left and right coils 56, 54 of the guidance antenna 50 are electrically connected to a guide circuit 134, with the guide circuit 134 being connected to the slave CPU 130 with servo controller 70 through an analog-to-digital input-output (ADIO) converter 136. Specifically, the slave CPU 70, master CPU 72, and ADIO decoder 136 are connected to a parallel bus 137. In the presently preferred embodiment, the ADIO converter 136 is an analog-to-digital conversion device made by Greenspring for converting the analog signal from the guide circuit 134 to a digital output for use by the slave CPU 130 with servo controller 70.

Referring briefly to FIG. 5, the guide circuit 134 includes a signal conditioning circuit and a frequency defining circuit. More particularly, the signal conditioning circuit of the guide circuit 134 includes a gain and level amplifier 138. Per the present invention, the guide signals from the coils 54, 56 are combined and then input to the gain and level amplifier 138. In response, the gain and level amplifier 138 amplifies the guide signal from the coils 54, 56 and establishes an output signal having an amplitude within a predetermined range.

Next, the signal is further amplified by a driver amplifier 140. Preferably, the driver amplifier 140 is a type MC34084 operational amplifier (opamp). Together, the amplifiers 138, 140 establish an output signal of the guide circuit 134 which has, after being processed through the remaining below-described components of the guide circuit 134, an amplitude of plus or minus five volts DC (±5vDC) when the coils 54, 56 are not equidistantly spaced from the guide wire 52, and an amplitude of minus one volt DC (−1vDC) when the coils 54, 56 are equidistantly spaced from the guide wire 52.

As shown in FIG. 5, the output of the driver amp 140 is sent to a fourth order switched capacitor bandpass filter 142. In accordance with principles well-known in the art, the bandpass filter 142 outputs only signals having a predetermined frequency. Next, a noise filter 144 filters noise from the signal in accordance with well-understood principles, and then the signal is rectified by a rectifier 146 and converted to DC by a root mean square (RMS) converter 148, also in accordance with well-known principles of signal processing.

The output signal of the guide circuit 134 is sent to the ADIO converter 136 as shown. Also, the output is sent to a frequency detector 150, which detects whether an output voltage is present and, hence, whether a signal having the proper frequency was passed by the bandpass filter 142. The output of the frequency detector 150 is sent to the master CPU 72 as shown, such that the master CPU 72 can determine whether guidance of the vehicle 12 has been lost by virtue of the absence of a guide signal from the guidance circuit 134.

FIG. 5 further shows the means by which the guide frequency is established. It is to be understood that instructions to follow a particular guidance frequency which the vehicle 12 is to "follow" are downloaded (via the rf link described above) from the respective vehicle manager 36 (FIG. 1) of the base station 16 to the VCON 20. In other words, the base station 16 instructs the VCON 20 which guide wire 52 to "follow".

This guidance signal instruction is transmitted from the master CPU 72 to a logic decoder 152. The logic decoder 152 converts the binary signal from the master CPU 72 to a guidance frequency command, and then sends the guidance frequency command to a multiplexer (MUX) decoder 154. FIG. 5 also shows that the MUX decoder 154 receives a plurality of frequency inputs from a clock frequency generator 156. Together, the logic decoder 152, MUX decoder 154, and frequency generator 156 establish a frequency defining circuit.

Per the present invention, each input from the generator 156 corresponds to a guide wire 52 frequency. Accordingly, the MUX decoder 154 matches the guidance frequency command with the appropriate input from the generator 156 and outputs a guidance frequency instruction to the bandpass filter 142 to configure the bandpass filter 142 to pass only signals having frequencies substantially equal to the guide frequency.

Referring back to FIG. 4, the output signal of the track location antenna 74 is sent to a position circuit 158. Preferably, the position circuit 158 is a TIRIS position circuit by Texas Instruments. In accordance with the present invention, the position circuit 158 periodically (e.g., every few hundred milliseconds) outputs transponder identification information to the slave CPU 130 with servo controller 70 over an RS232 connection 159, which in turn communicates to the master CPU 72.

Per the present invention, the position circuit 158 repeatedly generates a query pulse of about fifty milliseconds (50 ms) in duration which is transmitted by the track location antenna 74 toward the track 14. Then, the position circuit 158 is enabled for a predetermined period (e.g., thirty milliseconds) to receive a position identification signal pulse, which is generated by a transponder 76 (FIG. 1) if the transponder 76 is sufficiently close to the track location antenna 74.

As disclosed above, the position identification signal pulse is representative of the identity of the transponder 76 and, hence, is representative of the position of the vehicle 12 on the track 14. The position identification signal pulse is detected by the position circuit 158 and sent to the slave CPU 130 with servo controller 70 for use by the master CPU 72 as described below.

FIG. 4 shows that the guide circuit 134, position circuit 158, and ADIO converter 136 are connected to a select bus 160. It may now be appreciated that the ADIO converter 136 determines which of the circuits 134, 158 are read by the slave CPU 130. In other words, the ADIO converter 136 manages communications between the antennas 50, 74 and the CPUs of the present invention in accordance with principles well-known in the art to avoid communications interference.

FIG. 4 still further shows that the slave CPU 130 is connected to a connector backplane 162 via "B" and "C" connector ribbons 164, 166. It may now be appreciated that control signals from the slave CPU 130 with servo controller 70 are sent to the backplane 162 for controlling the servos that operate the various controls of the vehicle 12.

Preferably, the ADIO converter 136 is connected to the connector backplane 162 via a connector ribbon 168. The backplane 162 isolates the servo amplifiers 170 from the CPUs 70, 72 to limit the introduction of random, unintended commands to the servo amplifiers 170. In one presently preferred embodiment, the backplane 162 is physically configured as appropriate to provide convenient connections between the various components of the VCON 20. Preferably, the backplane 162 includes opto-isolators for isolating servo amplifiers 170 (also preferably made by Copley) that are connected to the backplane 162 from noise signals. And, the backplane 162 includes electrical buffers and electrical connector for effecting noise-free connection from the slave CPU 130 with servo controller 70 to the servo amplifiers 170. The skilled artisan will recognize that the servo amplifiers 170 are tuned for the particular vehicle 12.

Continuing with the description of FIG. 4, the servo amplifiers 170 are connected to a steering servo 172, a brake servo 174, an accelerator servo 176, and a shift servo 178. As indicated in FIG. 4 and disclosed in the second of the above-referenced patent applications, the servos 172–178 are respectively mechanically coupled to the steering wheel, brake pedal, accelerator pedal, and shifter of the vehicle 12.

Additionally, the servos 172–178 operate respective encoders 172a–178a and limit switches 172b–178b in accordance with well-known principles. As shown in FIG. 4, the signals from the encoders 172a–178a and limit switches 172b–178b are fed back to the backplane 162 and, hence, to the servo controller 70 for controlling the servo amplifiers 170 in accordance with servo feedback operation. In the presently preferred embodiment, the encoders 172a–178a output signals respectively representative of the positions of the steering wheel, brake pedal, accelerator pedal, and shifter of the vehicle 12. Also, the limit switches 172b–178b output signals representative of whether the steering wheel, brake pedal, accelerator pedal, and shifter, respectively, have reached predetermined positions.

FIG. 4 shows that the master CPU 72 is connected to a power up device (PUD) 180. As shown, the PUD 180 includes a flight recorder 182 which extracts data from the communications bus 184 of the vehicle 12. In one embodiment, the communications bus 184 is a so-called J1850 bus, and the flight recorder 182 is a Motorola 68HC11 microprocessor.

In accordance with the present invention, the data extracted from the bus 184 by the flight recorder 182 includes vehicle 12 speed, engine rpm, throttle position, and engine oil pressure low warning signal. This data is sent to the master CPU 72 as shown.

Also, the flight recorder 182 communicates with an input-output expander decoder 186. If desired, a manual data input device 188, such as a keypad, is also connected to the decoder 186. Further, the decoder 186 receives a vehicle 12 VCON internal temperature signal from one or more temperature sensors 190. The decoder 186 also receives from other of the sensors 190 signals that represent the temperatures of the shock absorbers of the vehicle 12. Advantageously, the temperature sensors 190 can be dual-blade thermocouples made by Marlin.

As shown in FIG. 4, the decoder 186 communicates with a key actuator 192 to operate the actuator 192. Details of the key actuator 192 are set forth in the first of the above-referenced patent applications.

A four position select switch 194 is also connected to the decoder 186. In the presently preferred embodiment, the select switch 194 can be manipulated to one of four positions. These positions respectively correspond to "disable", in which no power is to be supplied to the VCON 20, "power", in which power is supplied to the VCON 20 but the VCON 20 does not control the vehicle 12, "local", in which the vehicle 12 can be controlled through the VCON 20 by means of the manual input device 188, and "remote", in which the VCON 20 controls the vehicle 12 in response to signals downloaded from the base station 16. Thus, the signals from the select switch 194, manual input device 188, and temperature sensors 190 are sent to the master CPU 72 via the PUD 180 for use as described below.

Completing the description of FIG. 4, the VCON 20 uses power from various dc—dc voltage converters 196. In the example shown, the voltage converters 196 collectively generate 36 volt power, 15 volt power, 12 volt power, and 5 volt power. The voltage converters 196 receive input power from the battery 198 of the vehicle 12 via power relays 200 that are controlled by the PUD 180 as shown.

Figure 6:
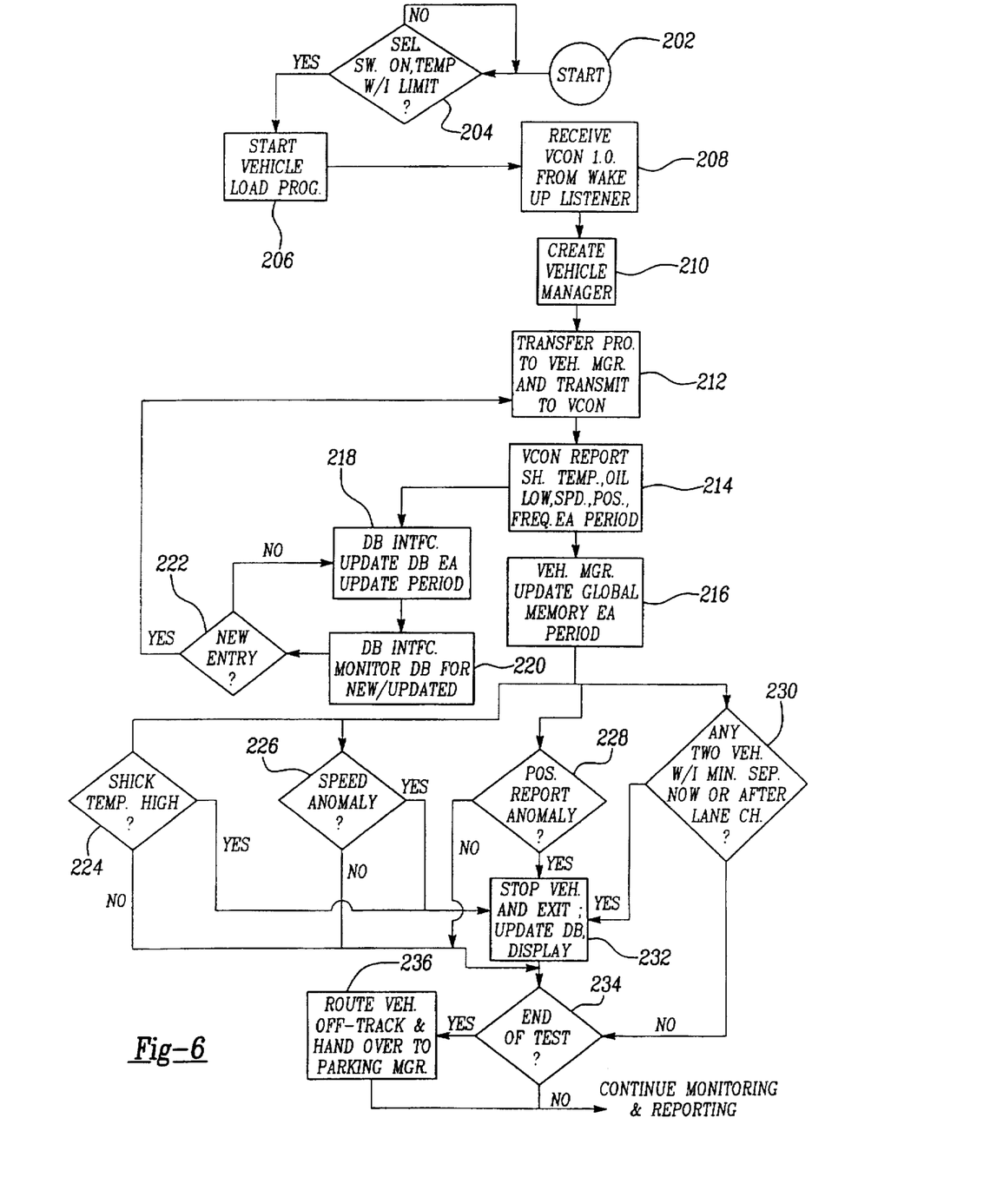
FIG. 6 is a flow chart showing the overall control steps of the present invention.

Now referring to FIGS. 1 and 6, the overall operation of the system 10 can be appreciated. It is to be understood that while for clarity of disclosure the discussion below focusses on a single vehicle 12, the system 10 undertakes the below steps for all vehicles 12 on the track 14. It is to be further understood that while the processes below are shown in flow chart format, they run continuously during operation of the vehicle 12 on the track 14, as indicated by the feedback loops in the flow charts.

The system starts at circle 202 and proceeds to decision diamond 204, wherein the VCON 20 determines whether the select switch 194 (FIG. 4) is in "remote" and whether the passenger compartment temperature as indicated by the sensors 190 is within the operating temperature limits of the VCON 20. If so, the logic proceeds to block 206, wherein the base station 16 signals the power-up device (PUD) to start the VCON 20 by appropriately operating the key actuator 192 (FIG. 4) as described in the second of the above-referenced patent applications. Also at block 206, the operator defines the desired test program of the vehicle 12 using the operator interface 18, the details of which are disclosed further below in reference to FIG. 12.

Next, at block 208, the vehicle 12 transmits its identification to the wake-up listener 40. In response, the wake-up listener 40 creates a vehicle manager 36 at the base station 16 at block 210. Then, at block 212, after receiving a start command from the operator system the base station 16 transfers the desired test to the vehicle manager 36, which in turn transfers it to the VCON 20 of the vehicle 12.

Once instructed and the vehicle 12 started, and the power-up switch (FIG. 4) in the remote position, the vehicle 12 drives around the track 14. While doing so, at block 214 the VCON 20 reports various data to the base station 16 via the rf network described above. More particularly, at block 214 the VCON 20 periodically (e.g., every three hundred milliseconds (300 ms)) reports shock absorber temperature, whether the low oil pressure switch of the vehicle 12 has been activated, vehicle 12 speed, vehicle 12 position as reported by the position circuit 158 (FIG. 4), and whether the required guide wire 52 frequency has been sensed as reported by the frequency detector 150 of the guide board 134 (FIG. 5).

Figure 11:
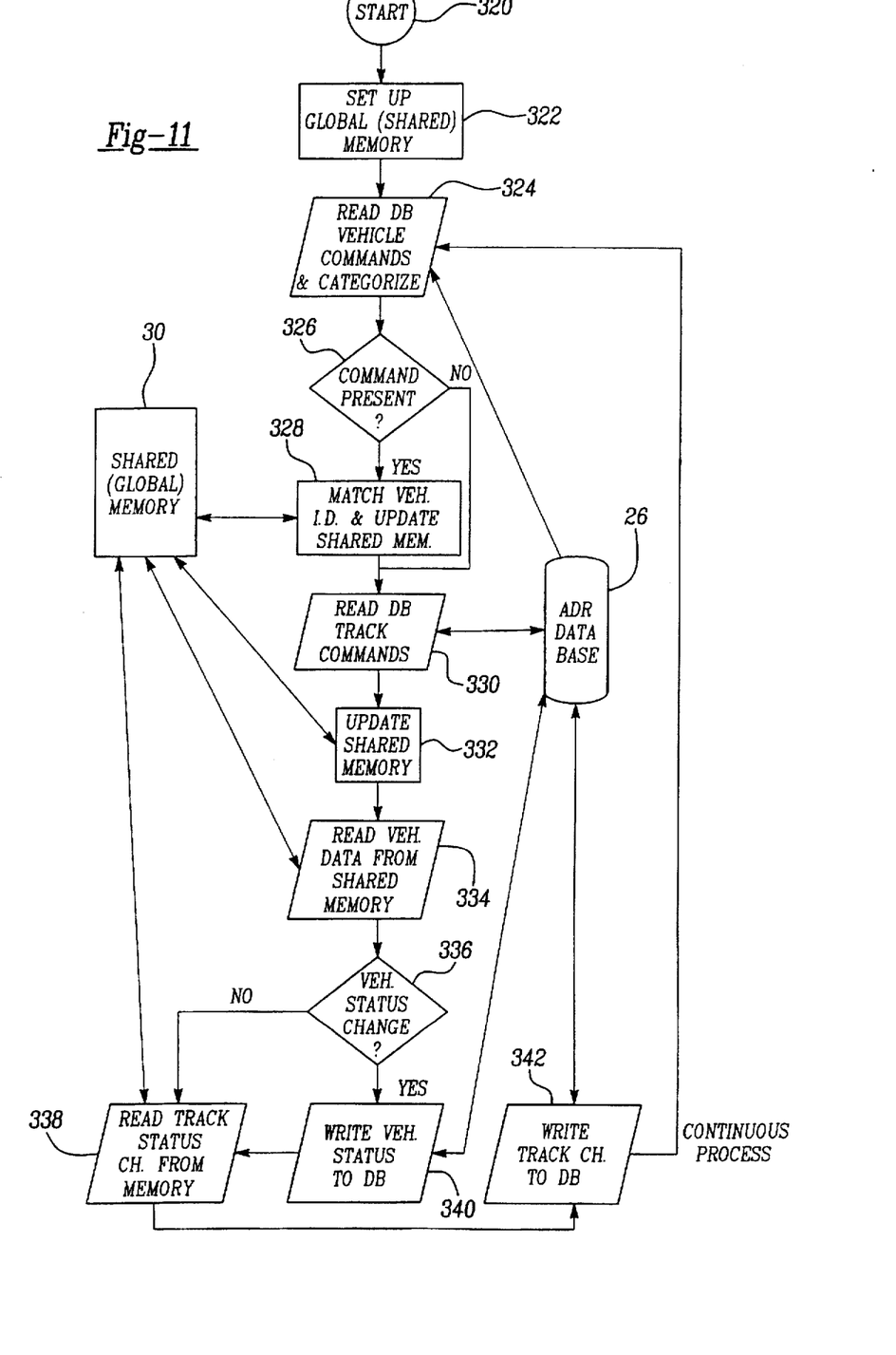
FIG. 11 is a flow chart of the database interface function of the base station.

The details of the data management of the present invention are discussed further below in reference to FIG. 11, but a general overview is shown in FIG. 6, wherein at block 216 the vehicle manager 36 updates the global memory 30 each reporting period. Also, at block 218 the database interface 32 updates the database 26 every update period, e.g., every five minutes. After updating the database 26, the database interface 32 monitors the database 26 for any new commands or updates entered into the database 26 via the operator interface 18 at block 220. At decision diamond 222, the database interface 32 determines whether a new entry is present in the database 26, and if so, the process loops back to block 212. Otherwise, the process returns to block 218.

From block 216, the base station 16 makes several determinations. Specifically, at decision diamond 224, the base station determines whether the reported vehicle 12 shock absorber temperature exceeds a predetermined temperature. If so, the base station 16 proceeds to block 232, wherein the vehicle 12 is stopped and exited from the track 14 using the process described in FIG. 10 below. Also, the database interface 32 updates the database 26, and the updated status is presented on the display 22.

On the other hand, from block 232 or decision diamond 224 if the base station 16 determines at diamond 224 that vehicle 12 shock absorber temperature does not exceed the predetermined temperature, the process proceeds to decision diamond 234, wherein the base station 16 determines whether the vehicle 12 test has been completed. If so, the base station 16 proceeds to block 236, wherein the vehicle manager 36 routes the vehicle 12 off-track using the process described below in reference to FIG. 10. Otherwise, the system continues to monitor and report as described. Also from diamond 234 if the test there is negative the system continues to monitor and report as described.

In addition to the determination made at decision diamond 224, the base station 16 determines, at decision diamond 226, whether the speed of the vehicle 12 is an anomaly. More particularly, the vehicles 12 on the track 14 operate at a common speed, e.g., twenty five miles per hour (25 mph) to avoid mutual interference. If a vehicle 12 reports a speed that exceeds or is less than the common speed by a predetermined amount, e.g., five miles per hour, an anomaly is indicated at decision diamond 226. If a speed anomaly exists, the process moves to block 232. Otherwise, the process moves directly to decision diamond 234.

Moreover, at decision diamond 228, the base station 16 determines whether the reported position of the vehicle 12 is an anomaly. More particularly, the vehicle 12 periodically reports its position as disclosed previously. Additionally, the vehicle manager 36 determines, based on the last reported position and reported speed, what the next position reported should be. If the reported position is not within a predetermined envelope (e.g., fifty feet) of the expected position, or if no report of a detection of a transponder 76 (FIG. 3) is made when expected, a position anomaly is indicated at decision diamond 228. If a position anomaly exists, the process moves to block 232. Otherwise, the process moves directly to decision diamond 234.

Furthermore, at decision diamond 230, the base station 16 determines whether any two vehicles are within a predetermined minimum separation distance (e.g., two hundred feet) of each other, both during the current cycle and at a predetermined time period in the future, e.g., thirty seconds. If the distance between any two vehicles is less than the minimum separation distance, an interference anomaly is indicated at decision diamond 230. If an interference anomaly exists, the process moves to block 232. Otherwise, the process moves directly to decision diamond 234.

Figure 7:
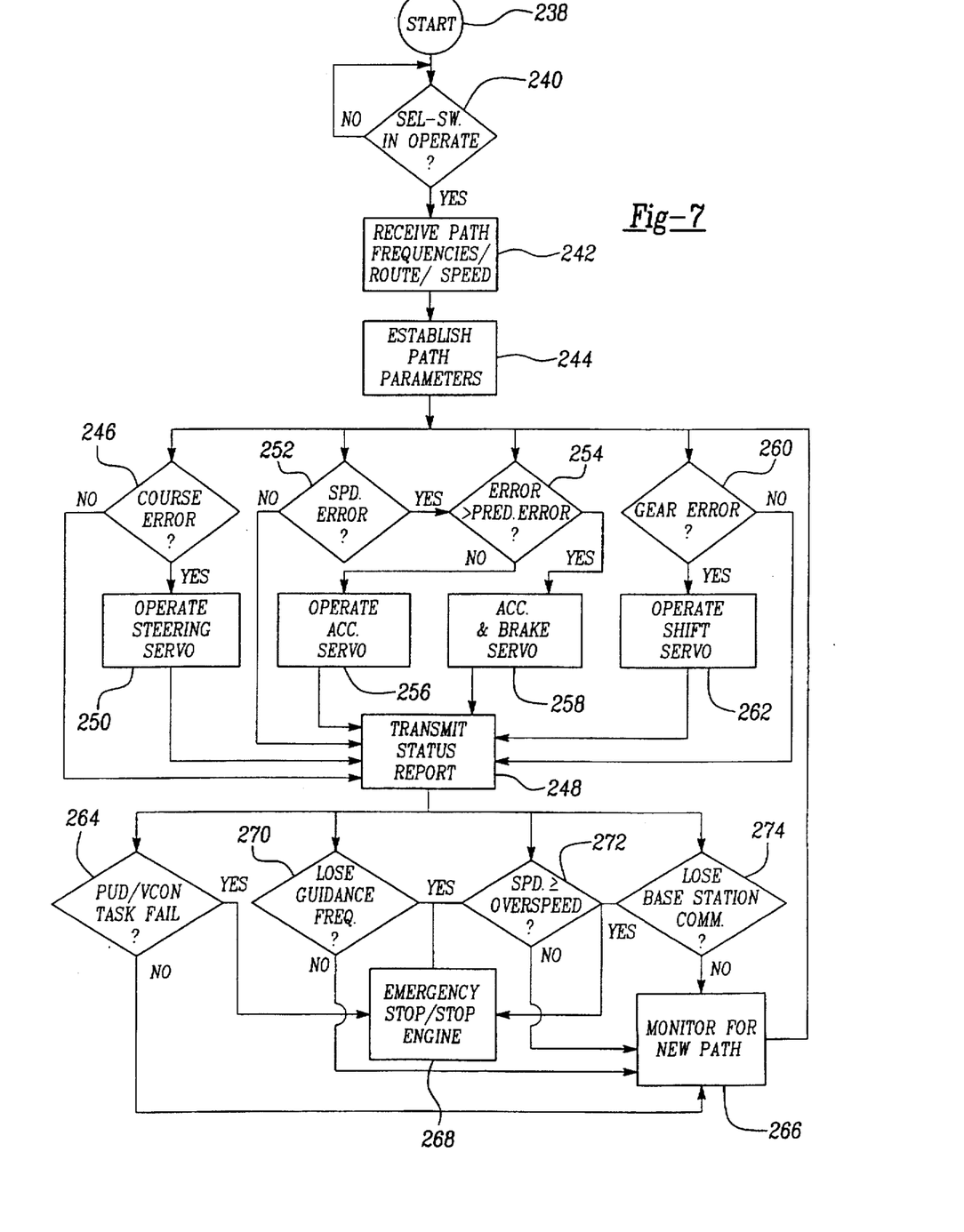
FIG. 7 is a flow chart showing the operational steps of the vehicle controller (VCON)

Now referring to FIG. 7, the operation of the VCON 20 can be appreciated. Starting at circle 238, the VCON proceeds to decision diamond 240, wherein the VCON 20 determines whether the select switch 194 (FIG. 4) is in the "remote" or "local" position, indicating that the VCON 20 is enabled to operate the vehicle 12 in response to base station 16 commands or manual input device 188 commands, respectively. As shown in FIG. 7, the VCON 20 does not proceed until the select switch 194 is in one of these operate positions.

Assume for purposes of disclosure that the switch 194 is in the "remote" positions. The VCON 20 then proceeds to block 242, wherein the VCON 20 receives the desired test instructions via the above-described rf communication path from the associated vehicle manager 36 (FIG. 1) of the base station 16. As described in reference to FIG. 8 below, the command from the vehicle manager 36 includes a routing sequence from transponder 76 to transponder 76 at predetermined speeds, following predetermined guide wire 52 frequencies.

The VCON 20 then moves to block 244 to establish motion parameters for the vehicle 12. For example, at block 244 the VCON 20 establishes initial positions for the servos 172–178 as appropriate to execute the first routing command received at block 242.

Steps 246–262 illustrate how the VCON 20 causes the vehicle 12 to execute the desired test. Stated differently, the process described below is a preferred example of a vehicle operating parameter error controller.

Figure 9:
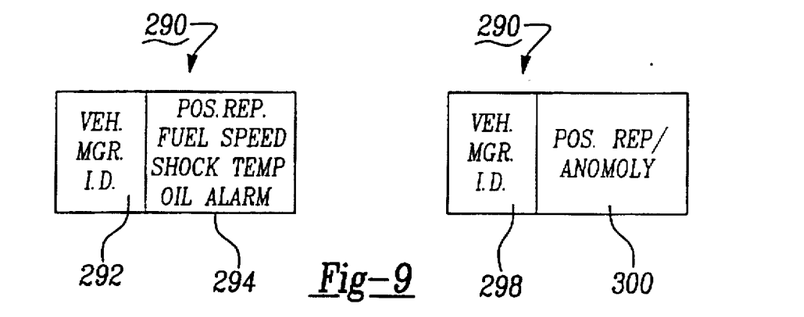
FIG. 9 is a schematic diagram of a report message.

Starting at decision diamond 246, based on the output signal of the guide circuit 134 the VCON 20 determines whether a course error is indicated. If not, the VCON 20 moves to block 248 to transmit a status report to the base station 16 at the appropriate transmission time. FIG. 9, discussed below, shows an example of a status report.

If, on the other hand, the VCON 20 determines that a course error exists, the VCON 20 moves to block 250 to operate the steering servo 172 (FIG. 4). In turn, the steering servo 172 operates a steering actuator to turn the steering wheel of the vehicle 12 as appropriate to correct the course error, in accordance with well-known servo feedback control principles. An example of a steering actuator that can be used is disclosed in the second of the above-referenced patent applications. After correcting the course error, the VCON 20 moves to block 248.

Additionally, the VCON 20 monitors for speed errors at decision diamond 252. To do this, depending on the desired speed, the VCON 20 monitors one or more of the following inputs from the flight recorder 182 (FIG. 4): speedometer reading (for higher speeds, e.g., in excess of 10 miles per hour), engine speed and engine throttle position (for lower speeds).

If a speed error exists at decision diamond 252, the VCON 20 proceeds to decision diamond 254 to ascertain the magnitude and direction of the speed error. If the magnitude and direction of the speed error do not exceed a predetermined error, the VCON 20 proceeds to block 256, wherein the accelerator servo 176 (FIG. 4) is activated to depress or release the accelerator of the vehicle 12 as appropriate to correct the speed error, in accordance with well-known servo feedback control principles. An example of an accelerator actuator that can be used is disclosed in the second of the above-referenced patent applications. It is to be understood that the predetermined magnitude and speed error is a predetermined overspeed error that is empirically established as appropriate for the particular model of the vehicle 12. From block 256, the VCON 20 moves to block 248.

On the other hand, if at decision diamond 254 it is determined that the magnitude and direction of the speed error exceed the predetermined error, the VCON 20 proceeds to block 258. At block 258, both the accelerator servo 176 and brake servo 174 (FIG. 4) are activated to correct the error in accordance with well-known servo feedback control principles. In other words, when the actual speed exceeds the desired speed by a predetermined amount, the accelerator pedal is released and the brake pedal depressed. An example of a brake actuator that can be used is disclosed in the second of the above-referenced patent applications. From block 258, the VCON 20 moves to block 248.

In addition, the VCON 20 determines, at decision diamond 260, whether the gear shift lever of the vehicle 12 is in a position appropriate for the desired speed. If it is not, the VCON 20 proceeds to block 262 to operate the shift servo 178, and thence to block 248. Otherwise, the VCON 20 proceeds directly to block 248 from decision diamond 260. An example of a shift lever actuator that can be used is disclosed in the second of the above-referenced patent applications.

Continuing with the description of FIG. 7, from block 248 the VCON 20 proceeds to decision diamonds 264, 270, 272, 274 to determine whether any failure mode exists in the vehicle 12, and to undertake corrective action if it does. Stated differently, the process described below is a preferred example of a vehicle safety shutdown determiner.

More particularly, at decision diamond 264 the VCON 20 determines whether any predetermined task of the VCON 20 and/or PUD 180 has stopped or otherwise failed. If not, the VCON 20 moves to block 266 to monitor for new commands from the vehicle manager 36, and then loops back to decision diamonds 246, 252, 254, and 260. Otherwise, the VCON 20 moves to block 268 to stop the vehicle 12 by causing the brake servo 174 to depress the brake pedal and by stopping the engine of the vehicle 12. In accordance with the present invention, the engine can be stopped by issuing an ignition off command to the key actuator 192. From block 268, the VCON 266 moves to block 266 to monitor for a new command in accordance with, e.g., FIG. 10 described below.

Moreover, at decision diamond 270, the VCON 20 determines, based on the signal from the guide circuit 134, whether the vehicle 12 has become distanced from or otherwise lost detection of the signal in the guide wire 52. If so, the VCON 20 proceeds to block 268, but if not, the VCON 20 proceeds to block 266.

Likewise, at decision diamond 272, the VCON 20 determines, based on the speedometer signal as sensed by the flight recorder 182, whether the speed of the vehicle 12 exceeds a predetermined speed. If so, the VCON 20 proceeds to block 268, but if not, the VCON 20 proceeds to block 266.

Similarly, at decision diamond 274, the VCON 20 determines, based on the signal from the vehicle transceiver 48, whether the vehicle 12 has lost communication with the base station 16. If so, the VCON 20 proceeds to block 268, but if not, the VCON 20 proceeds to block 266.

Figure 8:
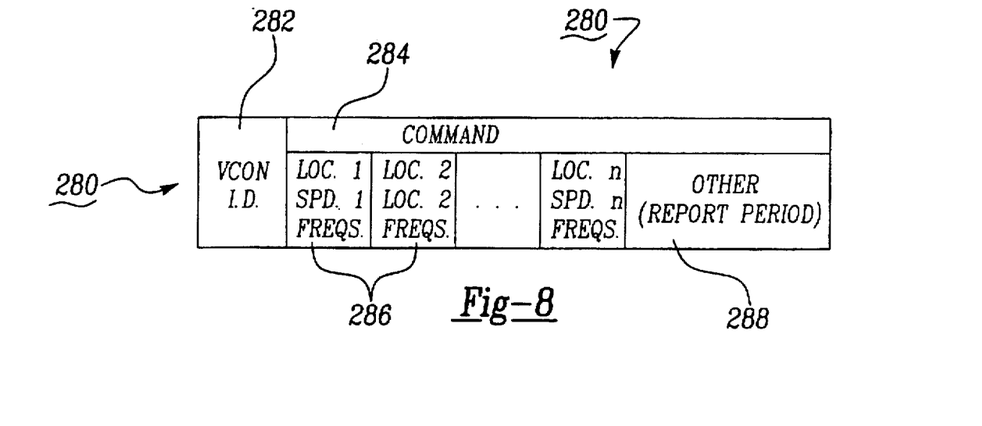
FIG. 8 is a schematic diagram of a control message.

Referring now to FIG. 8, a command message, generally designated 280, from a vehicle manager 36 of the base station 16 to an associated VCON 20 is schematically shown. As shown, the command message 280 includes a header 282 that identifies the particular VCON to which the message 280 is addressed. Also, the command message 280 includes a body 284. FIG. 8 illustrates that the body 284 includes a plurality of routing blocks 286, each of which carries data representative of a transponder 76 location, a vehicle speed, and a guide wire 52 frequency. It will readily be appreciated that together the routing blocks 286 establish a desired route and speed for the vehicle 12 around the track 14. If desired, an auxiliary data block 288 can be included to, e.g., command the VCON 20 to transmit status reports at predetermined intervals.

FIG. 9 schematically shows a routine status report message, generally designated 290, and an anomaly status report message, generally designated 296, each of which can be transmitted from a VCON 20 to an associated vehicle manager 36 at the base station 16. With particular regard to the routine status report message 290, a header 292 identifies the address of the associated vehicle manager 36, while a data block 294 includes data pertaining to reporting vehicle 12. Specifically, the data block 294 includes the current position of the vehicle 12 as indicated by the output signal of the position circuit 158 (FIG. 4), as well as the percent fuel remaining in the vehicle 12. Also, the data block 294 includes the current speed of the vehicle 12, shock temperature of the vehicle 12, and whether the oil pressure low switch of the vehicle 12 has been activated. It can now be appreciated that the latter four data items are based on the output signal of the PUD 180. In contrast, while the anomaly report message 296 includes a header 298 that identifies the address of the associated vehicle manager 36, the anomaly message 296 further includes a data block 300 that indicates the presence of one or more of the above-disclosed vehicle anomalies, along with the current position of the vehicle 12.

Figure 10:
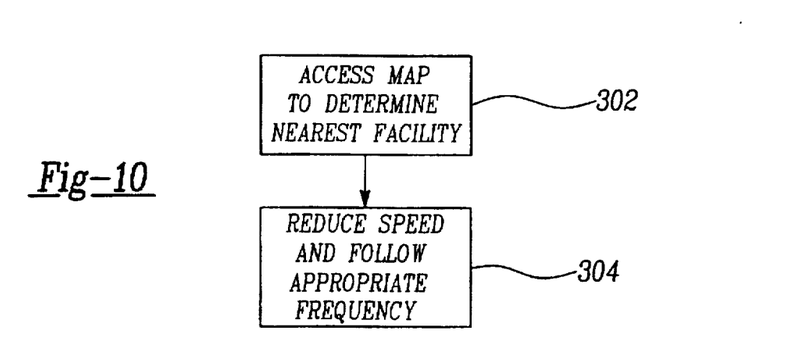
FIG. 10 is a flow chart of the off-track routing control.

FIG. 10 shows that in the event of an anomaly, or in the event that the vehicle 12 has completed its assignment, at block 302 the VCON 20 and/or its associated vehicle manager 36 accesses a map of the track 14 to determine the nearest off-track facility that is appropriate to receive the vehicle 12. For example, if the vehicle 12 has completed its assignment and is low on fuel, the nearest off-track facility that is appropriate to receive the vehicle 12 might be a track gas station located near the track 14. Access roads (not shown) having guide wires embedded therein connect the track 14 with the off-track facilities. Accordingly, in determining the nearest facility, the associated access road is also determined. Next, at block 304, the VCON 20 causes the vehicle 12 to reduce speed and follow the frequency of the guide wire that is embedded in the access road selected at block 302.

As mentioned above, FIG. 11 shows the details of the data management of the present invention at the base station 16. Commencing at start state 320, the process moves to block 322 to set up the global, i.e., shared, memory 30. Then, the process moves to data read block 324, wherein any vehicle commands entered into the database 26 by the operator interface 18 are read and categorized.

At decision diamond 326, it is determined whether any commands are present in the database 26, and if so, the vehicle commands are tagged, i.e., matched to, the appropriate vehicle at block 328. Also at block 328, the global memory 30 is updated to reflect the new commands.

From block 328, or from decision diamond 326 if the test there was negative, the process moves to data read block 330, wherein track commands in the database 26 are read. Examples of track commands have been discussed above, e.g., "all vehicles stop" is a track command issued for certain of the above-disclosed anomalies. Next, at block 332 the global (shared) memory 30 is updated as appropriate for the read performed at data read block 330.

From block 332, the process moves to data read block 334 to read vehicle data from global (shared) memory 30. At decision diamond 336 it is determined whether any vehicle status change has been reported by one or more of the vehicles 12 to the global memory 30 in accordance with principles discussed above, and if so, the process writes the status change to the database 26 at write block 340. From write block 340, or, if no vehicle status change has been reported at decision diamond 336, the process moves to read block 338, wherein track status changes are read from the global memory 30. Any changes are written to the database 26 at write block 342, and then the process returns to read block 324.

Figure 12:
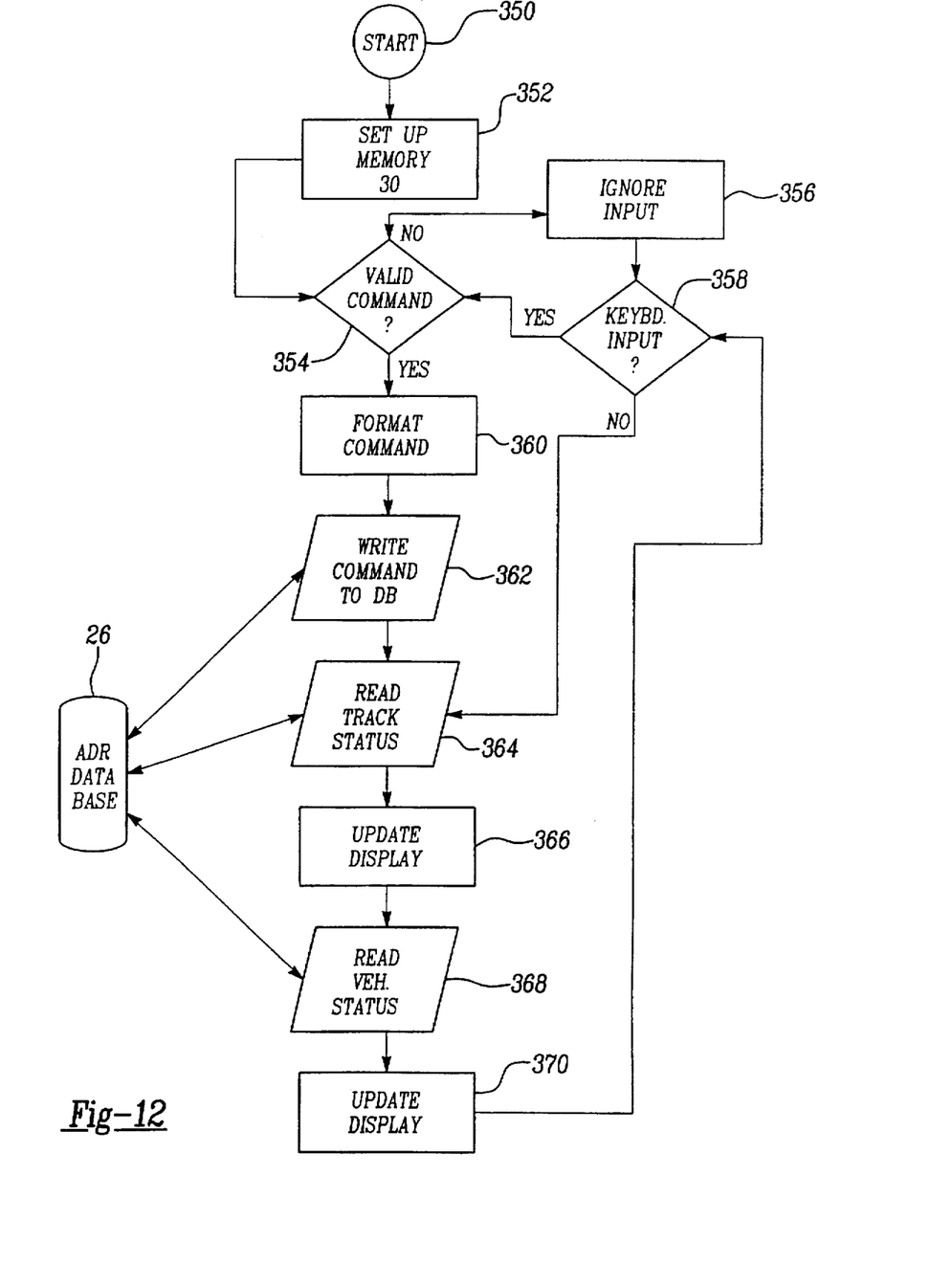
FIG. 12 is a flow chart of the operator interface operation.

FIG. 12 shows the operator interface processes of the present invention. From start state 350 the process moves to block 352 to set up the working memory. Next, at decision diamond 354, it is determined whether a valid command has been input, and if not, an invalid input is ignored at block 356. Moving from block 356 to decision diamond 358, it is determined whether a keyboard input from the input device 24 (FIG. 1). If so, the process loops back to decision diamond 354, to determine whether the entry was valid.

If a valid command has been input, the process moves to block 360, wherein the command is formatted as appropriate. Moving to write block 362, the command is written to the database 26. From write block 362, or from decision diamond 358 if no keyboard entry was made, the process moves to read block 364 to read the track status from the database 26. Then, at block 366 the display 22 (FIG. 1) is updated in response to the read at block 364. Then, the process moves to read block 368 to read the vehicle status from the database 26, and updates the active vehicle screen 22 (FIG. 1) at block 370 in response to the read at block 368. The process then loops back to decision diamond 358.

While the particular VEHICLE MOUNTED GUIDANCE ANTENNA FOR AUTOMATED DURABILITY ROAD (ADR) FACILITY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A position system for a remotely controlled vehicle disposed on a track having position transponders embedded therein, comprising:
 a vehicle controller (VCON) mounted in the vehicle;
 a position antenna movably mounted on the vehicle between a first vertical position above the track and a second vertical position higher above the track than the first, the position antenna being electrically connected to the VCON for transmitting a query pulse and detecting an echo pulse from one of the transponders.

2. The system of claim 1, further comprising an antenna mount having a stationary frame member connectable to rear license plate fastener receptacles of the vehicle and a sliding frame member slidably engaged with the stationary frame member, the antenna being held by the sliding frame member.

3. The system of claim 2, wherein the antenna is a generally rectangular loop antenna, and the sliding frame member includes:
 a transversely-oriented lower support block formed with side channels for respectively supporting side segments of the position antenna; and
 left and right plastic connecting plates fastened to the lower support block for maintaining the shape of the position antenna.

4. The system of claim 3, wherein the sliding frame member further includes:
 left and right vertically-oriented slide bars attached to the connecting plates;
 left and right bar bearings formed on the stationary frame member, each bar bearing being formed with a channel for closely supporting one of the slide bars, the slide bars being slidably engaged with the respective channels.

5. The system of claim 4, further comprising respective set screws manipulable for abutting respective slide bars to establish a height of the position antenna as appropriate for proper reception of echo signals from the transponders.

* * * * *